United States Patent [19]
Brown et al.

[11] 3,779,421
[45] Dec. 18, 1973

[54] APPARATUS FOR CONTAINING HIGHLY CORROSIVE MATERIALS UNDER PRESSURE

[75] Inventors: Larry P. Brown; Vaughan W. Rhoades, both of Tulsa, Okla.

[73] Assignee: Cities Service Oil Company, Tulsa, Okla.

[22] Filed: Oct. 22, 1971

[21] Appl. No.: 191,663

[52] U.S. Cl. .................................. 220/63, 220/3
[51] Int. Cl. ........................................ B65d 25/14
[58] Field of Search ............... 220/63, 64, 3, 46

[56] References Cited
UNITED STATES PATENTS
2,647,656  8/1953  Frisch ..................... 220/63 R X
2,547,521  4/1951  Buehler ..................... 220/3 X Primary Examiner—Herbert F. Ross
Assistant Examiner—Steven M. Pollard
Attorney—J. Richard Geaman

[57] ABSTRACT

An improved apparatus for containing highly corrosive materials under pressure. The apparatus is utilized in conjunction with a housing having a blind end machined in its bottom and an open end to which a top is connected. The improvement of the present invention comprises means for isolating the corrosive materials to be contained under pressure from the housing and forming a seal having increasing sealing ability in relationship with increasing pressures exhibited in the housing.

3 Claims, 1 Drawing Figure

PATENTED DEC 18 1973 3,779,421
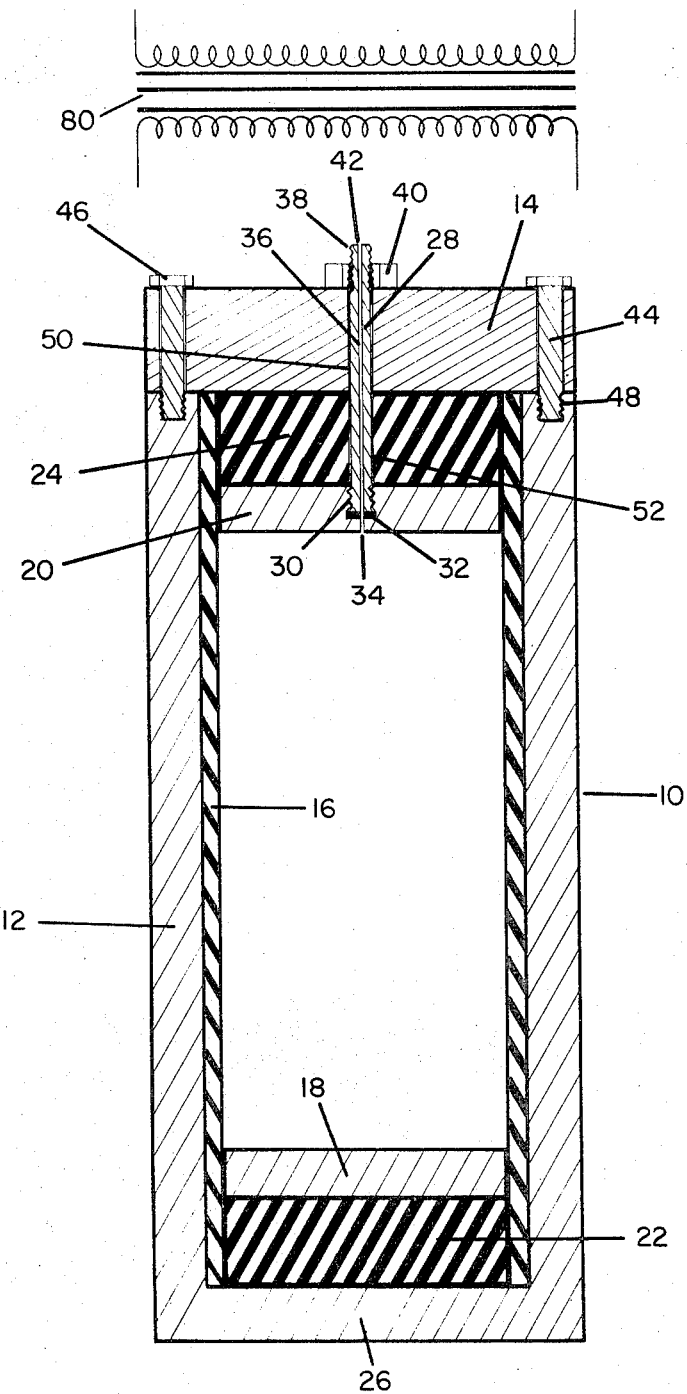

1

APPARATUS FOR CONTAINING HIGHLY CORROSIVE MATERIALS UNDER PRESSURE

BACKGROUND OF THE INVENTION

The present invention relates to means for containing highly corrosive materials under pressure. More particularly, the apparatus of the present invention comprises means for sealing a metallic housing from corrosive materials, said means having an increasing ability to seal the housing from the corrosive materials in relationship with an increase of pressure exhibited by the materials contained within the housing.

Apparatus utilized for phase equilibria studies, reaction kinetics studies, reaction of corrosive materials under pressure, and other physical and chemical interactions of corrosive materials under pressure and temperature, particularly in the use of high pressure autoclaves, have developed inherent problem wherein the metallic materials of construction utilized for their high strength under pressure for containing materials are found to exhibit metallic embrittlement in the presence of corrosive materials, for example hydrogen sulfide. The corrosive effects of the materials contained in the housing weaken the metal, causing disproportionate stresses to develop within the housing, creating a dangerous situation for personnel working within the area of reaction or experiment.

What is required is apparatus for the containment of highly corrosive materials under pressure having the conventional form of a housing formed from a metal cylinder and having a blind machined end for a bottom cylinder and an open end to which a top is connected by two or more bolts passing therethrough and into reamed threaded recesses contained within the upper portion of the housing and further having provision for an inlet in the top through which materials may be injected and withdrawn.

It is the object of the present invention to provide apparatus for the containment of highly corrosive materials under pressure.

It is a further object of the present invention to provide means for sealing a metallic housing from corrosive materials contained in under pressure so as to prevent metallic embrittlement of the housing.

It is still a further object of the present invention to provide apparatus wherein corrosive materials may be contained under pressure within the metallic housing, having appropriate means for sealing the corrosive materials from the metallic housing, said means exhibiting the ability to yield an ever-increasing sealing contact and prevention of fluid contact between the corrosive materials and the housing in relationship with the increasing pressure exhibited by the corrosive materials contained within the housing.

With these and other objects in mind, the present invention may be more fully understood by referral to the accompanying drawing and the following discussion:

SUMMARY OF THE INVENTION

The objects of the present invention are accomplished through utilization of an improved apparatus for containing highly corrosive materials under pressure. The apparatus forms the convention configuration of the type comprising a housing formed from a metal cylinder having a blind machined end for a bottom and an open end to which a top is connected by two or more bolts passing therethrough into reamed and threaded recesses contained within the upper portion of the housing and further having an inlet in the top through which materials may be injected or withdrawn. The improvement in the apparatus of the present invention comprises an inert sleeve positioned within the housing and protecting the metallic housing from the corrosive materials contained therein. The inert sleeve is utilized in conjunction with a lower inert-compressive disc having a diameter approximately that of the inside diameter of the inert sleeve and is positioned in the bottom of the housing so as to mate at its sides with the inert sleeve and form a seal against the bottom of the metallic housing, protecting it from the corrosive materials. A first pressure plate, having a diameter similar to the lower inert-compressive disc, is positioned on the lower inert-compressive disc within the housing so as to be exposed to the corrosive materials which are subsequently introduced in the housing. An upper inert-compressive disc having a diameter approximately of that of the inside diameter of the inert sleeve is positioned in the upper portion of the housing so as to mate at its sides with the inert sleeve and form a seal against the top, protecting it from the corrosive materials. The upper inert compressive-disc has a hole therethrough for the passage of materials. A second pressure plate, having a diameter similar to the upper inert-compressive disc, is positioned against the upper inert-compressive disc within the housing and has a hole therein for the passage of materials which is aligned with the hole contained within the upper inert-compressive disc. In conjunction with the inert sleeve and the upper inert-compressive disc are means for retaining the second pressure plate against the upper inert-compressive disc prior to pressurization of the corrosive materials within the housing.

BRIEF DESCRIPTION OF THE DRAWING

The present invention may be more fully understood by referral to the accompanying drawing in which a housing utilized for pressure studies of highly corrosive materials is depicted, having the improved apparatus of the present invention associated therewith.

DETAILED DESCRIPTION OF THE INVENTION

The present invention is most easily depicted by referral to the accompanying Figure in which the improved apparatus 10 of the present invention for containing highly corrosive materials under pressure is depicted. The improved apparatus 10 is of the type comprising a housing 12 formed from a metal cylinder having a blind machined end 26 thereon for a bottom and an open end to which a top 14 is connected by two or more bolts 46 passing therethrough into reamed threaded recesses 44 contained within the upper portion of the housing 12 and further having an inlet 50 in the top 14 through which materials may be injected and withdrawn.

The improvement of the present invention comprises the inert sleeve 16 positioned within the housing 12 being formed of an inert material, for example a rubber such as neoprene, which is inert to corrosive materials to be studied, for example a hydrogen sulfide-hydrocarbon system, thereby protecting the metallic housing 12 from the corrosive materials contained within the housing. The lower inert-compressive disc 22 having a diameter approximately that of the inside diameter of the inert sleeve 16 is positioned in the bottom of the housing 26 so as to mate at its sides with the inert sleeve 16 and form a seal against the bottom of the metallic housing 26, protecting it from corrosive materials contained within the housing 12. A first pressure plate 18, having a diameter similar to the lower inert-compressive disc 22 is positioned on the lower inert-compressive disc 22, within the housing 12, so as to be exposed to the corrosive materials subsequently introduced in the housing 12. An upper inert-compressive disc 24, which also may be formed of an inert-rubber material similar to the material utilized for the inert sleeve 16, having a diameter approximately that of the inside diameter of the inert sleeve 16 is positioned in the top of the housing 12 so as to mate at its sides with the inert sleeve 16 and form a seal against the top of the metallic housing 14, protecting it from the corrosive materials. Inert-compressive disc includes a hole 52 for passage of materials. A second pressure plate 20, having a diameter similar to the upper inert-compressive disc 24, is positioned against the upper inert compressive disc 24 within the housing 12 so as to be exposed to the corrosive materials contained within the housing 12. A threaded hole 30 is reamed in the top of the second pressure plate 20 for the passage of materials, the hole 30 being aligned with the hole 52 in the upper inert-compressive disc which further has an aperture 34 aligned with the hole 30 through which materials may pass from within the housing to out of the housing.

Means are provided for retaining the second pressure plate 20 against the upper inert-compressive disc 24 prior to pressurization of the corrosive materials within the housing 12. The means may take the preferred form as shown in the Figure wherein a retaining shaft 28 is provided having an aperture 36 reamed therethrough in axial alignment with its ends and having a diameter such that it may pass through the holes contained within the top of the housing 14 and the upper inert compressive disc 24 and being threaded on each end with the threads at the lower end being received by the threads of the second compressive plate 30. An O-ring 32 is seated in the bottom of the threaded portion of the hole 52 of the second pressure plate 24 so as to form a seal between the second pressure plate 24 and the retaining shaft 28. Adjustment nut 40 is turned upon the upper end of the thread 38 of the retaining shaft 28 and backed against the exterior of the top 14 so as to hold the seocnd pressure plate 20 against the upper inert-compressive disc 24. After loading, the retaining shaft 28 affords upward movement of the plate 20 during fluid pressuring, thereby forming the improved apparatus for containing highly corrosive materials under pressure of the present invention.

Of course, the apparatus of the present invention may take many forms, for example the second pressure plate may be formed of a metallic material with the means for retaining the second pressure plate against the upper inert compressive disc comprising magnetic means, for example an electromagnet 80, externally positioned in proximity to the exterior of the top so as to draw the pressure plate against the upper inert-compressive disc during the period of loading of the chamber and pressurization of the corrosive materials contained within the chamber.

The materials of construction of the apparatus of the present invention may comprise for the housing and top the normal materials utilized for high pressure autoclaves utilized in phase equilibria and reaction kinetic studies, for example stainless steel metal alloys. The inert sleeve and inert-compressive discs could comprise, for example rubber compounds or other materials being non-corrosive to the materials introduced within the housing and having a compressibility and cold flow characteristic so as to form a seal under pressure. Through the configuration of design disclosed herein, the pressure plate may comprise the same materials of construction as the housing or other rigid materials which may be subjected to corrosion through extended use in the apparatus of the present invention, but are replaceable and do not form a costly economic deterrant to the fabrication of the apparatus. In a similar fashion, the retaining shaft and bolts may comprise materials of construction which are not readily corrosive, but generally utilized in autoclave design and the O-ring may comprise the same material as the inert sleeve and inert compressive disc or other materials of construction which are not degraded upon exposure to the materials contained within the housing.

Therefore, the apparatus of the present invention provides means for containing highly corrosive materials under pressure through utilization of sealing means which have the particular ability of forming an increased sealing capacity upon increase of pressure exhibited within the housing. The apparatus removes the inherent problems encountered by previous high pressure vessels in not requiring expensive materials of construction for the containment of corrosive materials under high pressures and temperatures.

While the invention has been described above with respect to certain embodiments thereof, it will be understood by those skilled in the art that various changes and modifications may be made without departing from the spirit and scope of the invention as set forth herein.

Therefore, we claim:

1. Improved apparatus for containing highly corrosive materials under pressure of the type comprising a housing formed from a metal cylinder having a blind machined end for a bottom and an open end to which a top is connected by two or more bolts passing therethrough into reamed and threaded recesses contained within the upper portion of the housing and further having an inlet in the top through which materials may be injected and withdrawn, the improvement comprising:

a. an inert sleeve positioned within the housing and protecting the metallic housing from the corrosive materials;

b. a lower inert-compressive disc having a diameter approximately that of the inside diameter of the inert sleeve positioned in the bottom of the housing so as to mate at its sides with the inert sleeve and form a seal against the bottom of the metallic housing protecting it from the corrosive materials;

c. a first pressure plate having a diameter similar to the lower inert-compressive disc, positioned on the lower inert-compressive disc within the housing so as to be exposed to the corrosive materials subsequently introduced in the housing;

d. an upper inert-compressive disc having a diameter approximately that of the inside diameter of the inert sleeve positioned in the top of the housing so as to mate at its sides with the inert sleeve and form a seal against the top of the metallic housing, protecting it from corrosive materials, and having a hole therethrough for the passage of materials;

e. a second pressure plate having a diameter similar to the upper inert-compressive disc, positioned against the upper inert-compressive disc within the housing so as to be exposed to the corrosive materials contained within the housing and having a hole therein for the passage of materials and aligned with the hole in the upper inert-compressive disc; and f. means for retaining the second pressure plate against the upper inert-compressive disc prior to pressurization of the corrosive materials within the housing.

2. The apparatus of claim 1 wherein the second pressure plate has threads reamed in the top portion of the hole and the means for retaining the second pressure plate against the upper inert-compressive disc comprise:

a. a retaining shaft, having an aperture reamed therethrough in axial alignment with its ends and having a diameter such that it may pass through the holes contained within the top of the housing and the upper inert-compressive disc and being threaded on each end with the threads of the lower end being received by the threads of the second pressure plate;

b. an O-ring seated in the bottom of the threaded portion of the hole of the second pressure plate so as to form a seal between the second pressure plate and the retaining shaft; and c. an adjustment nut turned on the upper end of the threads of the retaining shaft and backed against the exterior of the top so as to hold the second pressure plate against the upper inert-compressive disc during material loading.

3. The apparatus of claim 1 wherein the second pressure plate is metallic and the means for retaining the second pressure plate against the upper inert-compressive disc comprise magnetic means exteriorly positioned in proximity to the exterior of the top.

* * * * *